United States Patent [19]

Topham

[11] Patent Number: 5,417,238
[45] Date of Patent: May 23, 1995

[54] TILLAGE IMPLEMENTS

[76] Inventor: Peter D. T. Topham, Caldecote Manor Farm, Abbotsley, St. Neots, Cambs PE19 4XQ, United Kingdom

[21] Appl. No.: 39,414

[22] PCT Filed: Oct. 22, 1991

[86] PCT No.: PCT/GB91/01847
§ 371 Date: Apr. 16, 1993
§ 102(e) Date: Apr. 16, 1993

[87] PCT Pub. No.: WO92/06578
PCT Pub. Date: Apr. 30, 1992

[30] Foreign Application Priority Data

Oct. 23, 1990 [GB] United Kingdom ............... 9023079
Jul. 15, 1991 [GB] United Kingdom ............... 9115307

[51] Int. Cl.⁶ .................... A01B 5/04; A01B 15/16
[52] U.S. Cl. ........................................ 137/221; 137/167
[58] Field of Search ............ 172/144, 358, 195, 196, 172/167, 161, 162, 218, 219, 220, 221, 765, 770, 771

[56] References Cited

U.S. PATENT DOCUMENTS

| | | | |
|---|---|---|---|
| Re. 18,348 | 2/1932 | Hill | 172/167 |
| 205,498 | 7/1878 | Palmer | 172/167 |
| 469,046 | 2/1892 | Martin | 172/167 |
| 735,506 | 8/1903 | Hatcher . | |
| 955,047 | 4/1910 | Bradfield | 172/221 |
| 1,026,912 | 5/1912 | Hardt | 172/221 |
| 2,620,714 | 12/1952 | Baldwin | 172/167 |
| 2,676,524 | 4/1954 | Bashor | 172/219 |
| 2,839,983 | 6/1958 | Walsh | 172/167 |
| 3,833,067 | 9/1974 | Peterson, Jr. et al. . | |
| 4,165,787 | 8/1979 | Perkins | 172/219 |
| 4,246,971 | 1/1981 | Johnson . | |
| 4,687,065 | 8/1987 | Cope et al. | 172/167 |
| 5,135,056 | 8/1992 | Sartor | 172/221 |

FOREIGN PATENT DOCUMENTS

| | | |
|---|---|---|
| 586463 | 7/1989 | Australia . |
| 0397873 | 11/1990 | European Pat. Off. . |
| 455691 | 8/1913 | France . |
| 62265 | 6/1955 | France . |
| 1070866 | 12/1959 | Germany . |
| 832431 | 4/1960 | United Kingdom . |
| 2008987 | 6/1979 | United Kingdom . |
| 2137461 | 10/1984 | United Kingdom . |
| 2154845 | 9/1985 | United Kingdom . |
| 2217966 | 11/1989 | United Kingdom . |

*Primary Examiner*—Eric K. Nicholson
*Attorney, Agent, or Firm*—Harness, Dickey & Pierce

[57] ABSTRACT

A tillage element for use in a plough, harrow or the like is described which comprises a disc having a substantially planar portion and an inclined flange portion extending from the periphery of said central portion, an abrupt transition being provided from the central portion to the flange portion. The tillage element provides better penetration, inversion of soil and improved ploughing as compared with a conventional disc plough having concavely curved rotary discs. The invention also relates to tilling apparatus using a plurality of such tillage elements and description is given as to how the tillage elements can be used in such apparatus in combination with a leg provided with a point with the tillage element being pivotable readily between positions, permitting both left- and right-hand ploughing alternatively to be carried out.

17 Claims, 6 Drawing Sheets

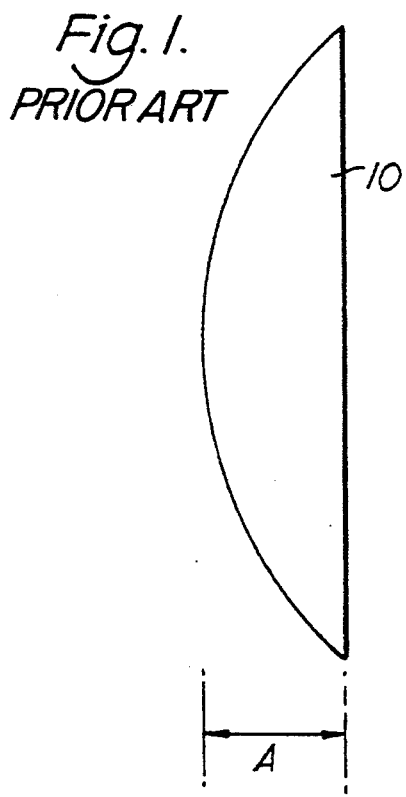
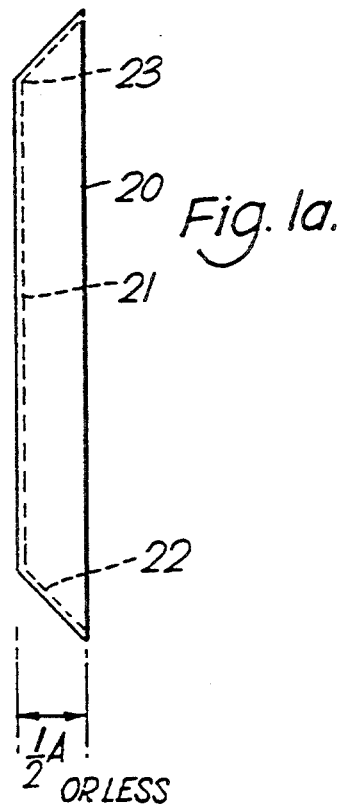
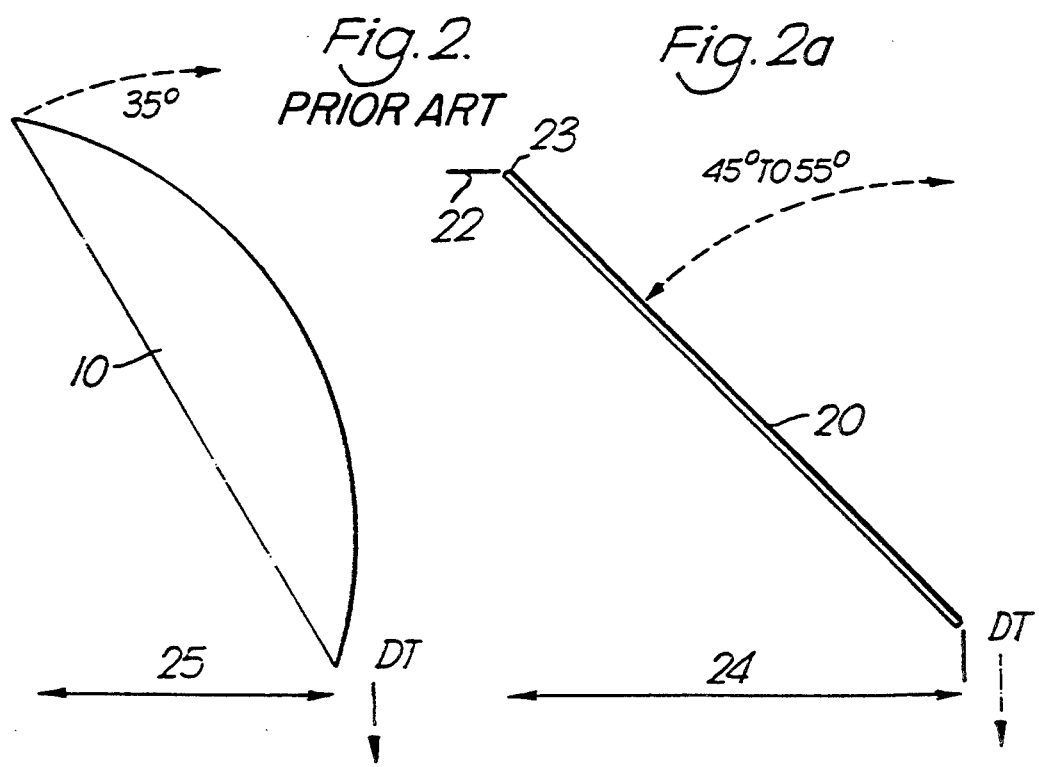

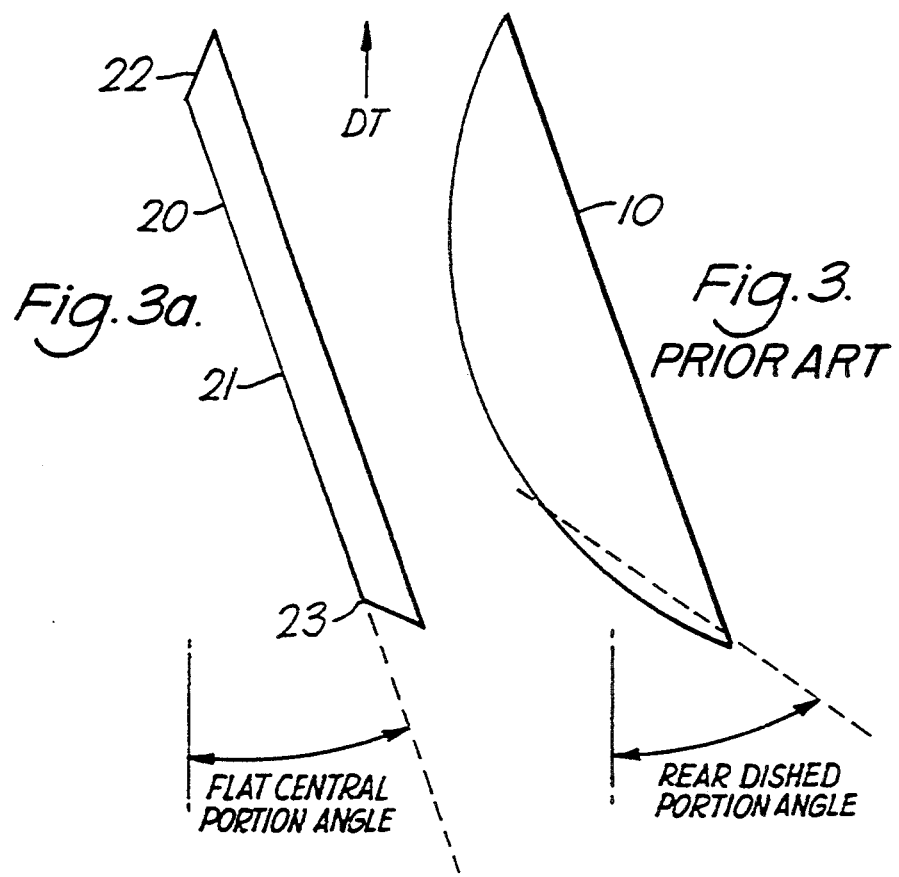
Fig. 3a.
Fig. 3. PRIOR ART
FLAT CENTRAL PORTION ANGLE
REAR DISHED PORTION ANGLE
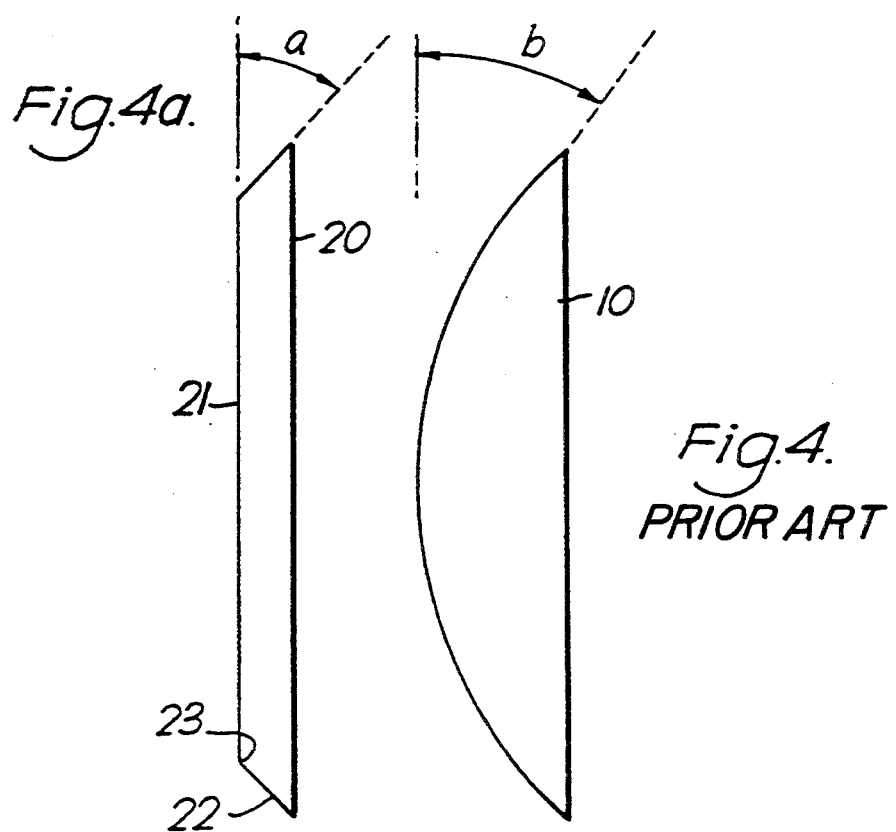
Fig. 4a.
Fig. 4. PRIOR ART

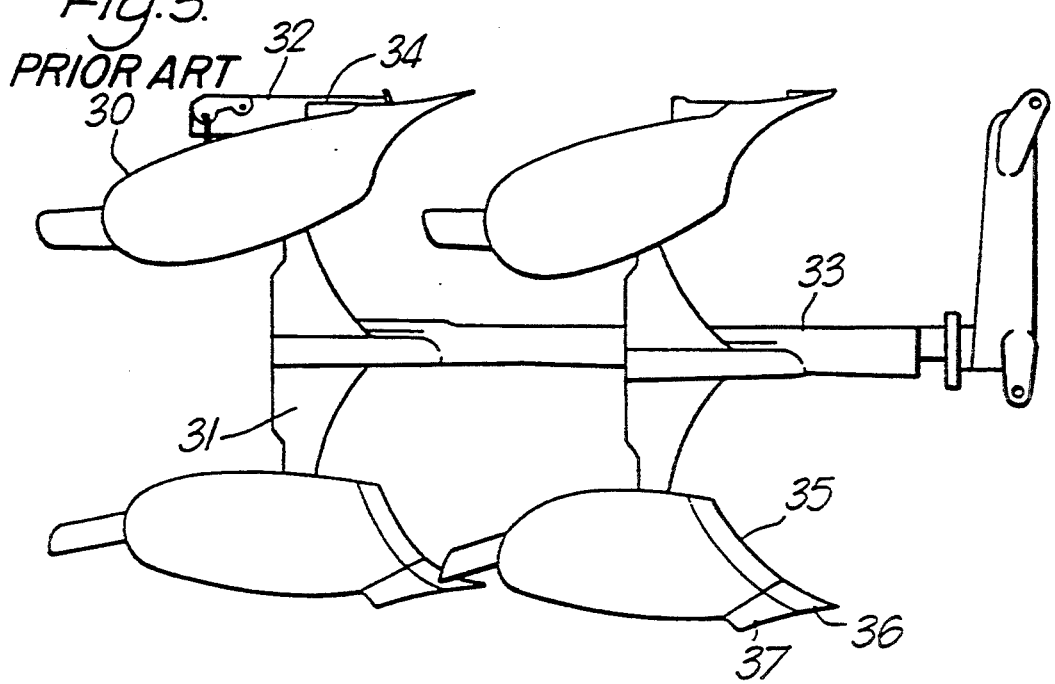
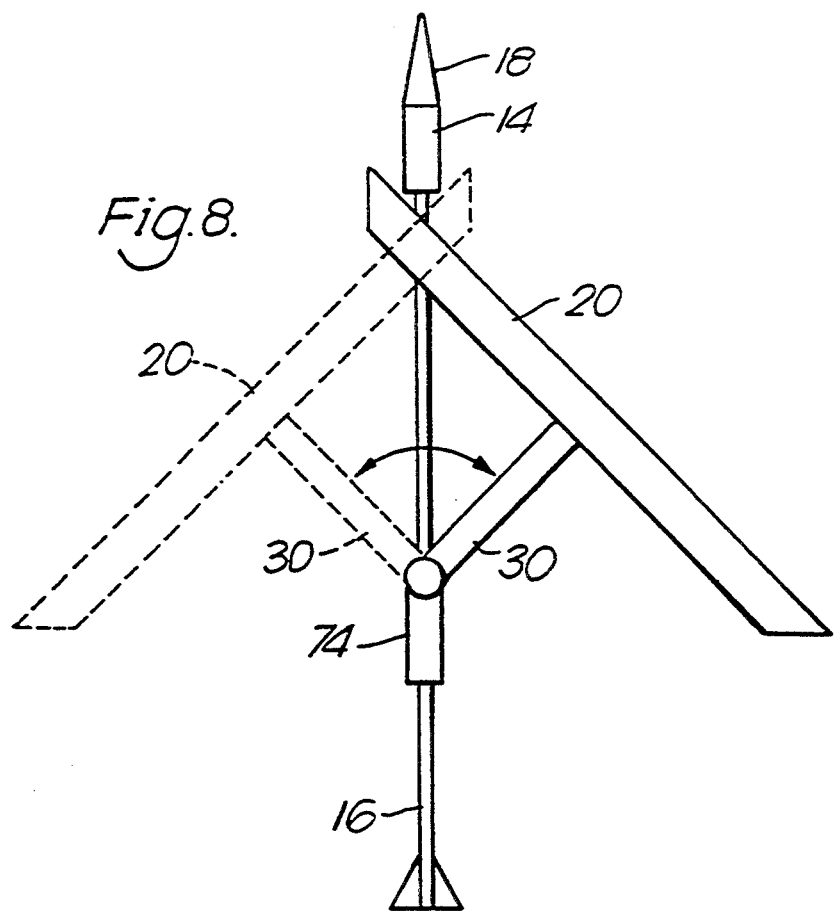

TILLAGE IMPLEMENTS

This invention relates to tillage implements. While the invention more especially relates to ploughs, it is also applicable to harrows and other cultivation and tillage apparatus.

Farmers are currently faced with the prospect of complete ban on straw and stubble burning. This represents a considerable problem for arable farmers since the volume of straw produced by grain crops is far more than is required for animal bedding purposes and like uses. Moreover, the cost of transporting straw in bulk for other uses is prohibitive, even if such uses could be found. Accordingly, there is a need to incorporate the straw into the ground from whence it has grown.

Many proposals have been made for straw incorporation, including the use both of ploughs and of harrows. The success of these proposals depends very much on the conditions prevailing when the straw is to be incorporated into the soil. Generally speaking, problems are much less acute on light soil.

The present invention has been found to be particularly useful for dealing with the problems which arise in the case of heavy land and/or wet and dry conditions though it is efficiently useful over a very wide range of ground conditions.

In the case of heavy land, mouldboard ploughs are found to be of somewhat limited utility. When the ground is hard and dry, penetration is a problem and wear of all soil-engaging parts of the plough is excessive, and thus costly. When the land is wet, the mouldboard plough causes an unacceptable level of soil compaction, arising from the dynamic effect of the moving soil engaging the relatively stationary mouldboard.

Disc ploughs have been tried, of course. While the rotary action of a disc reduces the compaction effect mentioned above, there nevertheless remains, particularly in the case of heavy straw burying conditions, the problem of achieving effective straw burial. Disc ploughs and disc harrows tend to produce a mixing action which does not bury the straw fully and this leads to problems in wet conditions.

In short, I have identified a need for an improved plough which can achieve a good burying effect with straw, comparable perhaps to that of a mouldboard plough, yet achieving low dynamic compaction properties of a disc plough, and/or one or more other improvements in relation to matters discussed or disclosed herein, or generally.

According to the present invention, there is provided tilling apparatus comprising a frame, a plurality of tillage elements mounted on the frame for rotation about their respective axes, each tillage element comprising a disc having a substantially planar portion and an inclined flange portion extending from the periphery of said central portion, an abrupt transition being provided from the central portion to the flange portion, the axes of the different tillage elements being at least substantially parallel one with the other, and a plurality of soil penetrating elements, each soil penetrating element being mounted in front of the forward edge of a respective associated tillage element.

While tillage elements of the shape as used in the present invention and having a substantially planar central portion and an inclined peripheral flange portion have previously been proposed, for example in DE-C-1 070 866, this has been in connection with use instead of conventional curved discs in harrows and the like with no appreciation of the advantageous action which can be achieved for deep ploughing when used with a leading penetrating point to provide an initial earth breaking action to assist entry to the required depth with the soil of the soil inversion wheel.

GB-A-2 137 461 discloses a cultivator attempting to overcome the problem of stubble incorporation met by the present invention but, despite being more complicated, fails to appreciate the manner in which the problem can be solved. This prior proposal basically uses a series of soil working element progressively to break and turn the soil without proposing any way of providing the positive soil inversion provided by the present invention. In all embodiments, this prior proposal uses conventional concave discs which are less efficient in turning over and inverting the soil than the tillage elements used in the present invention and also fails to appreciate the need to provide an initial soil penetrating element or point associated one with each tillage element. This prior proposal preferably uses initial soil tilling means randomly disposed across the width of the apparatus as compared with the main discs but where the same number of initial soil tilling means are provided as there are tilling discs they are in the form of small plough share type elements not accurately aligned with the leading edge of the discs with the result that it cannot achieve the clean, effective soil inversion action obtained by the use of a simple soil penetrating element as in the present invention.

In use, the tillage element has the function of producing soil transfer by a rolling motion across the flat central portion, after cutting by the forward edge. The rearward part of the dished edge portion then throws and inverts the soil over the straw, to achieve an effective straw burying action.

By providing a flat central portion for the rotary tillage element, the performance during use is greatly enhanced due to the relatively lower angle of attack provided by the flat central portion, as compared with the dished central portion of conventional disc plough discs. The result is a maintenance of the momentum of the soil even where the ploughing is under adverse soil conditions. As a result, the tillage element can be set at an increased angle with respect to the direction of advancement of the plough. For example, the element can be set at an angle of 65° with respect to the direction of forward travel in soil conditions where the angle might be 35° in the case of a known disc plough or disc harrows.

In a preferred embodiment, provision is made for the dished peripheral portion of the tillage element to be replaceable, by means of a bolting action, whereby the element can be renewed at intervals during its use. This means that at relatively low cost, a plough can be refurbished. For example, an 8' cut plough, having five tillage elements can be refurbished in this way relatively cheaply.

The angle of inclination of the dished peripheral portions of the tillage element may be from 5° to 75° with respect to the flat central portion, preferably from 30° to 60°, and more preferably still from 40° to 50°. The diameter of the central portion of the tillage elements may be from 15 cm (6") to 120 cm (4').

The width of the dished edge portions of the tillage element may vary according to requirements. Usually, the width would be not less than 2.54 cm (1"). The width may be up to 30 cm (12") or more. A typical 120 cm (4') diameter central portion could require a peripheral portion of approximately 30 cm (12") width. On the other hand, a central portion of 15 cm (6") diameter might well require a peripheral portion of 5 cm (2") width. In general, the relative dimensions can be varied, depending upon the soil type and type of soil tilling action required. Thus one could well have a smaller width flange when tilling heavy or sticky ground than when tilling light soil.

The central portion, while being preferably flat can have a slight degree of curvature, concave or convex, without undue detrimental effect.

In use, the peripheral portion of the tillage element has a cutting effect which provides good penetration and draft and is generally aligned in the fore/aft direction, so that the central body portion is therefore inclined with respect thereto. The furrow of soil is rolled over and the soil is thrown by the peripheral portion after it has crossed the flat disc.

The effect of the relatively abrupt change in surface direction where the flange meets the central portion fractures the soil and assists in causing soil cut from the bottom of the furrow to be raised and inverted or turned over to cover the original surface soil. Clean shattered soil is thus deposited on top of the straw-containing portion leaving the land in an open and lively state.

The peripheral cutting edge can be provided as a bolt-on portion which is thus readily replaceable.

The preferred embodiment provides the unconventional proposition of a disc plough which can be used on heavy land and which works better than both mouldboard ploughs and existing disc type ploughs.

Amongst other modifications which could be made in the invention as described above is the use, instead of a replaceable cutting edge provided in the form of a bolt-on edge portion only, of a complete disc or dish, with the central portion being detachably secured to a body which itself is rotatably carried on a mounting axle by means of a bearing assembly.

The invention will be further described, by way of example, with reference to the accompanying drawings, in which:

FIGS. 1 and 1a illustrate in diagrammatic cross-section a conventional tillage disc and a tillage element, later referred to as a dish or inverting wheel, as used in the apparatus of the present invention;

FIGS. 2 and 2a are views similar to FIG. 1 but giving a comparison of the typical width of cut of a conventional curved disc and the flanged dish element as used in the present invention;

FIGS. 3 and 3a illustrate the comparative orientations of a concave disc and the flanged dish to give similar widths of tilling;

Figure 6:
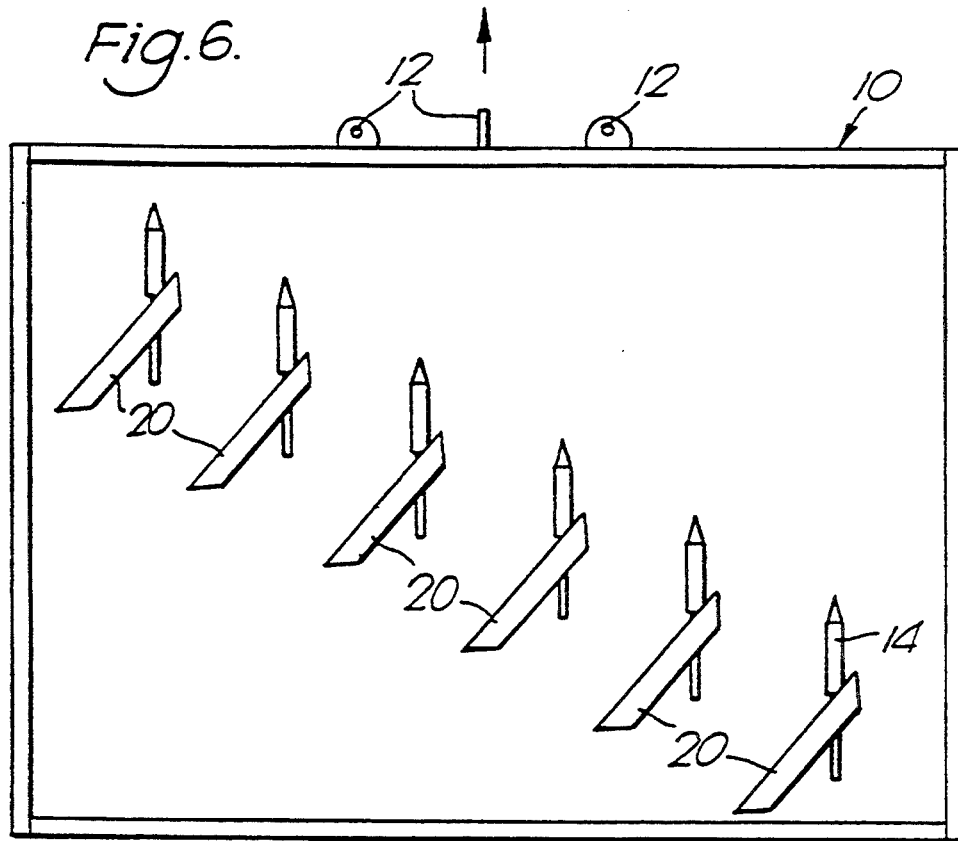
Figure 10:
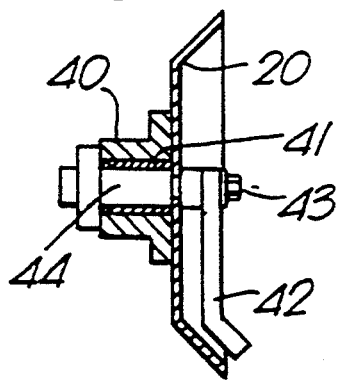
Figure 7:
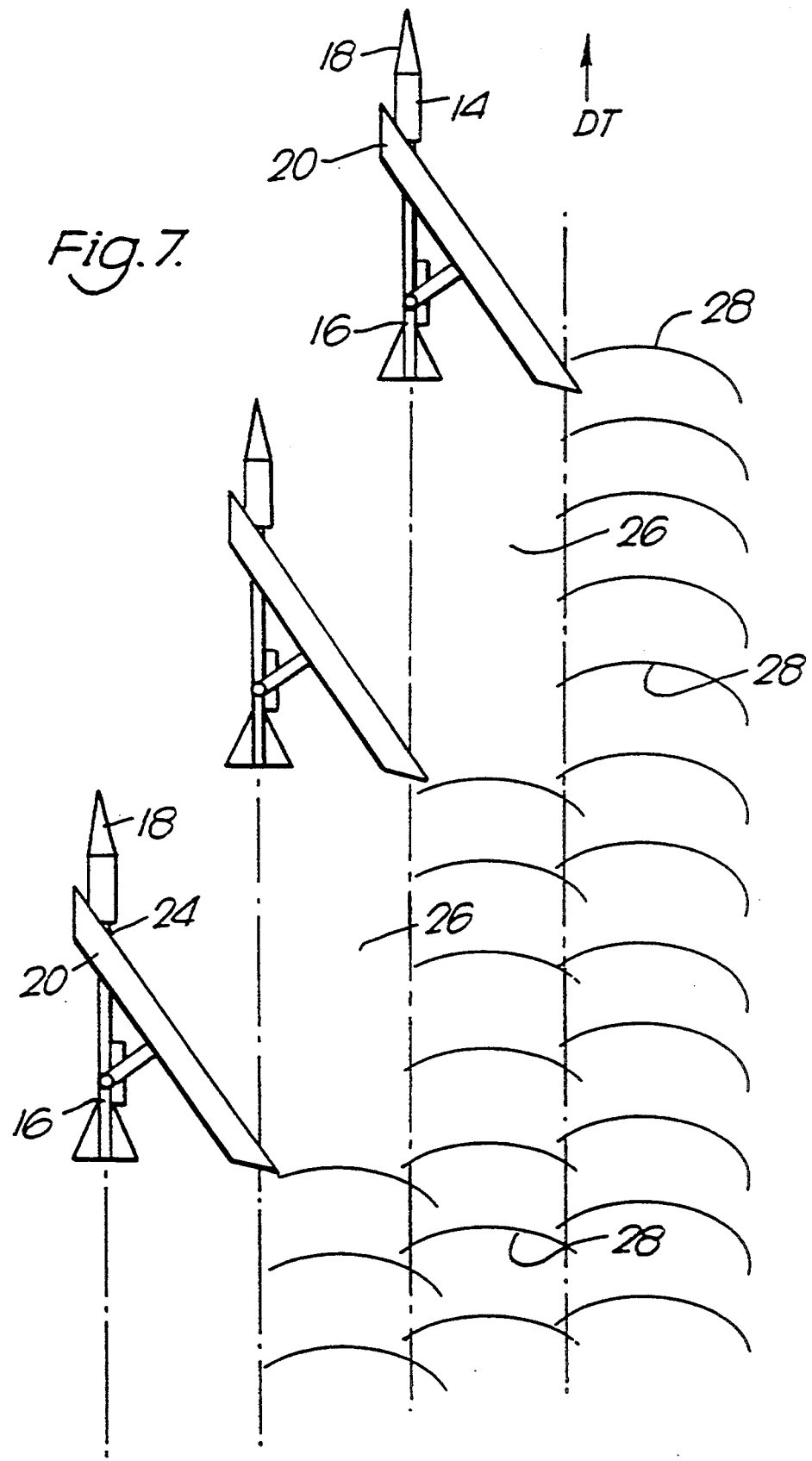
Figure 9:
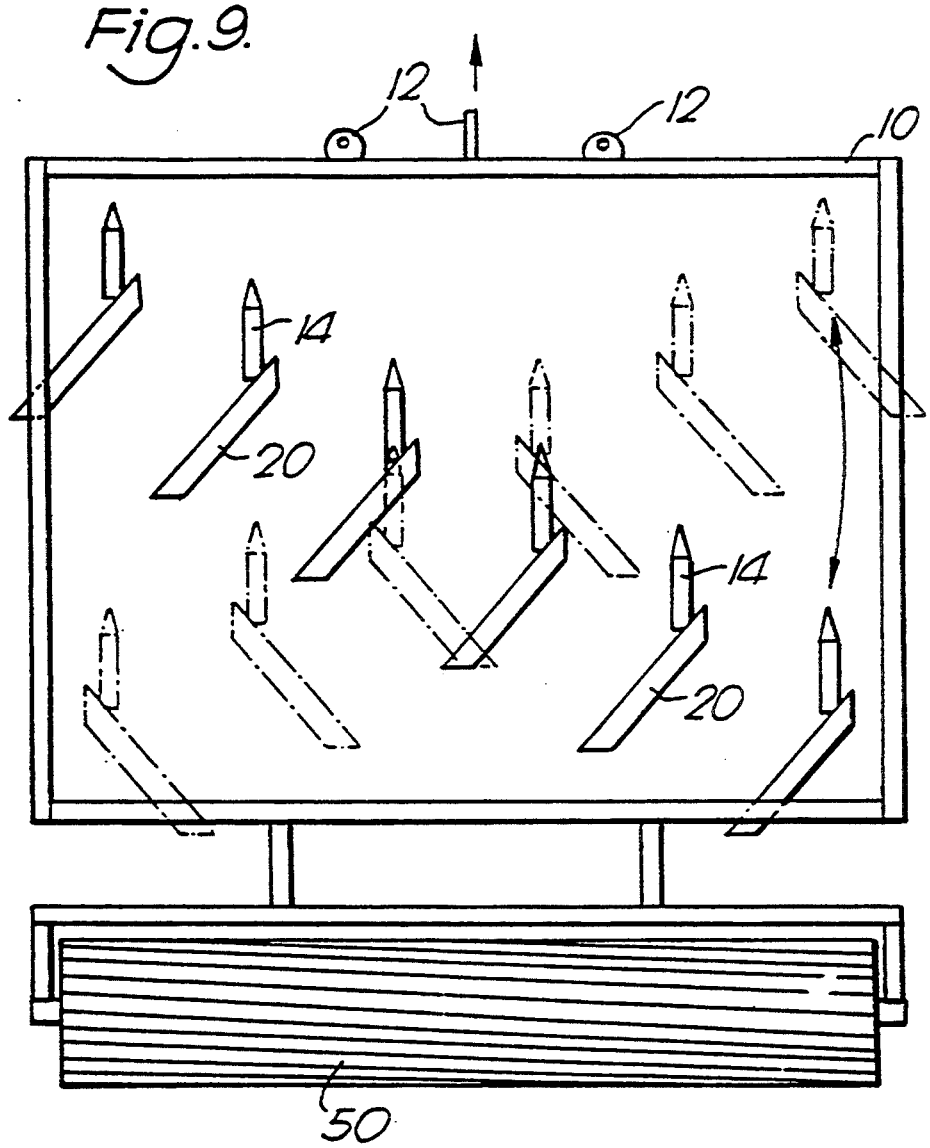

FIGS. 4 and 4a compares the cutting edge angles of the concave disc and flat centred tillage implements;

FIG. 5 is an illustration in plan of a known mouldboard plough;

FIG. 6 is an illustration of tilling apparatus embodying the present invention with a series of tillage elements diagonally spaced across the frame of the apparatus;

FIG. 7 diagrammatically illustrates the action of ploughing apparatus embodying the present invention to produce succession of parallel furrows;

FIG. 8 illustrates the alternative positions of a tilling element to permit both left- and right-hand ploughing;

FIG. 9 is a diagrammatic illustration of tillage elements provided in a frame and movable between positions alternatively arranged for right-hand and left-hand tilling, a crumbler roller being shown towed behind the frame;

FIG. 10 is cross-sectional view of the tillage element and scraper element mounted on the hub.

Figure 11:
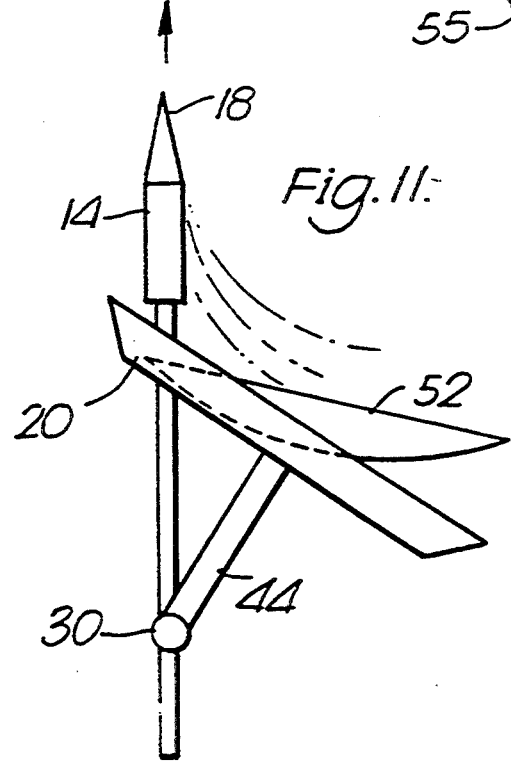

FIG. 11 shows a skimmer associated with the tillage element; and

Figure 12:
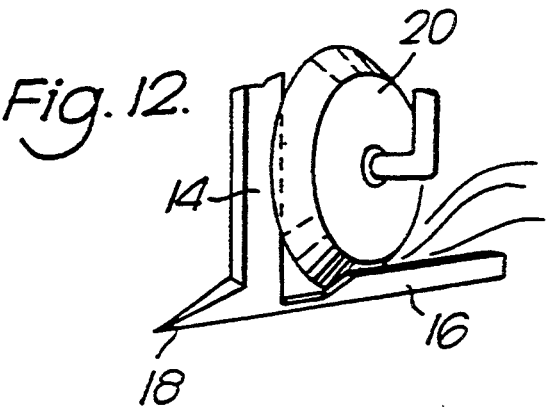

FIG. 12 is a sketch in perspective showing the relationship between a tillage element and associated soil penetrating leg and landslide.

FIG. 1 and 1a illustrate in side elevation a conventional concave cultivating disc 10 as may be used in a conventional disc plough, harrow or other disc tilling apparatus and 20 illustrates a tillage element as used in the present invention which is in the form of a dish or inverter wheel element comprising a generally planar base 21 and a flanged portion 22 about the periphery of the base with an abrupt transition 23 being provided between the flange portion and the central planar portion. Whilst, preferably, this abrupt transmission is angular as illustrated, this is not essential and it can have some slight curvature, for example if the flange portion 22 and central portion 21 are being press-formed. The central portion 21, whilst preferably planar, may be slightly curved in either a convex or concave form but generally must be such as to provide for substantially unobstructed flow of soil thereacross during use of the tilling element. The flange portion 22 preferably is frustoconical as illustrated although this may be slightly curved, for example to give a slight concavity or convexity. The tillage element 20, as can be seen in FIG. 1, has a depth or width which can be half the width or less than the depth or width A of a conventional tilling disc. Whilst the preferred smooth edge to the dish is illustrated, for some soil conditions it may be preferred to have a scalloped or otherwise formed edge to the periphery of the flanged portion. Also, apertures may be provided through the central and/or flange portions to assist breaking of the soil.

FIG. 2 and 2a illustrates the advantage of the additional width of cut which is obtainable with the tillage element 20 as compared with a conventional ploughing disc 10. Because of the improved efficiency, both of the flange portion 22 cutting into the soil and better distribution of the soil across the tilling disc a substantially wider cut 24 can be achieved with the tillage element 20 as compared with the narrow cut 25 obtainable with the conventional tilling disc 10 under the same soil conditions. Typically, the maximum angle of operation of a conventional ploughing disc or disc harrow having a penetration similar to the tillage element used in the present invention is 35°, although in many cases they cannot operate as steeply as that, the tillage element as used in the present invention can operate at very much greater angles, illustrated as 45° to 55° in FIG. 2 although with a suitable construction, particularly for lighter soils, the angle could be as much as 70° although the more preferred range is 40° to 60°.

FIG. 2 and 2a show the typical maximum displacement possible for a conventional disc 10 dependent upon the rear dished angle getting to a size such that if increased any further the soil could no longer successfully pass the disc with self-rotation of the disc while with the same width of tilling for the tillage element 20, the centre portion 21 of the tillage element is at a relatively small angle with the direction of travel due to the soil being moved from the cutting edge progressively across the whole width of the element as opposed to the fact that the soil is only shifted laterally on a conventional disc 10 during the latter part of its movement across the diameter of the disc. As can clearly be seen from FIG. 3, substantially greater inclination of the tillage element 20 can be achieved before the leading edge of the flange is aligned with the direction of travel DT in the most efficient tilling position giving a far wider tilling action as already described in connection with FIG. 2.

FIGS. 4 and 4a illustrate the different cutting angles a and b for the tillage element 20 and the conventional disc element 10. Thus, the angle a is seen to give a far more aggressive cutting edge than the angle b, this giving better penetration, draft and soil throw from the rear of the tillage element 20.

While it is believed that the essential general shape of the tillage element 20 can be appreciated from the description already given, it should be stressed that there is no essential requirement for the tillage element to be manufactured as a single piece. Thus, by having the flange provided as a separate bolt-on piece, it can very easily be changed when worn or when a different dimensioned or shaped flange is required due to a change in the soil to be worked. The central portion of the tillage element needs to be sufficiently heavily made to provide it with sufficient strength to resist distortion in use, despite its flat shape. Instead of the flange portion only being exchanged, the complete disc may be fabricated as one piece to be detachably secured onto a mounting hub, shown diagrammatically in FIG. 10, by which it is rotatably mounted on the axle of a plough beam or other mounting frame, as will be described later. The hub can provide structural reinforcement to the flat central portion of the disc.

As previously indicated, disc ploughs are known using conventional concavely curved discs 10. However, these discs, when held vertically, have problems in that they lack the penetration needed to provide the required depth necessary to bury straw and stubble, they lack stability if it is attempted to use them to the required ploughing depth, and because of its concavity it requires a wider space than the tilling element as used in the present apparatus. For example, a concave disc of 76 cm (30") diameter will have a concavity of about 15 cm (6") while a tilling element of the same diameter as used in the present apparatus, need only have a depth of 2.5 to 7.6 cm (1 to 3").

As compared with the conventional disc plough, the tilling element as used in the present invention is able to work at a sharper angle with respect to the forward direction of the plough and move a wider cut of soil than the same diameter concave disc under similar soil conditions. Because of the wider soil cut, a larger open furrow is left than with a conventional concave disc of the same size, this increasing the straw-burying capacity. The central portion of the tilling element can be made very strongly with a replaceable frame or supported by a substantial base such that the construction is stronger than with the centre of a conventional concave disc enabling it to withstand the very high pressures which can arise during moving heavy clay land under extreme conditions.

Because of its narrow width and well defined cutting edge, the tilling element 20 can readily be used in conjunction with a soil penetrating leg 14 which assists the plough disc 20 by providing further penetration and stability. It also permits a construction in which the tillage element can very readily be reversed on a single axis about the leg to provide a simple reversible plough. A conventional concave disc cannot physically be arranged in this manner. The narrow width of the tillage element permits the use of large mounting bearings able to withstand long and hard operation.

An additional advantage with the tillage element as used in the present apparatus is that as it wears, it maintains the same cutting angle. In contrast therewith, a conventional concave disc loses its attacking angle progressively as it wears and reduces in diameter with consequent increased loss of efficiency.

Because of improved efficiency of displacement of soil across the tillage element 20 during use, the soil does not run up high on the centre portion of the element so that the centre of the element remains exposed. This enables, when necessary, the central shaft or axle mounting the element, as diagrammatically illustrated in FIG. 10, to be used to support a scraper, skimmer or other implement to cooperate with the element in a manner such that the element can be made reversible. With the conventional normal sized concave disc, the earth rides up over the centre of the disc such that it is impossible to expose and make use of the mounting axle.

While the above comparison has been given in conjunction with the differences from conventional tilling discs, the plough embodying the present invention has advantages over a conventional mouldboard plough. In particular, a mouldboard plough, in wet conditions, tends to create a pan. The plough embodying the present invention, by using a leg 14 and a point 18 in conjunction with each tillage element 20 does not create a pan. A plough using the present invention requires far less power to pull it with the various tillage elements than a conventional mouldboard plough, the tillage elements needing to be less widely staggered along the plough beam than the plough bodies of the mouldboard plough, thus reducing the length and making the plough far more handy in use.

FIG. 5 illustrates a conventional mouldboard plough which has a series of ploughing elements comprising mouldboard 30 mounted by legs 31 to a central plough beam support 33 with each mouldboard 30 being provided with a landslide 32, frog 34, shin 35, point 36 and wing 37 as illustrated in FIG. 5. Reversibility for tilling in opposite directions is provided by having two sets of mouldboard ploughs, one being in the earth and the other being supported in the air when ploughing in one direction, the different mouldboards being reversed for ploughing in the opposite direction by rotation about the central plough beam 33.

As compared therewith, the present invention, as illustrated in FIG. 6, can be used in a plough frame 10 provided with tractor links 12.

The tillage elements 20 and associated legs 14 are spaced equally apart diagonally across the frame 10 with the arrangement being generally more compact than possible with conventional mouldboard ploughs or disc ploughs. The rear of the frame 10 is shown as being supported and stabilised by a flanged steel land wheel 55. Alternatively, a rubber tired wheel may be used. One or more of these wheels may be provided, each rotatable about an axis which, when viewed in plan, is either transverse or inclined to its longitudinal extent of the cultivator. The wheel may be castoring.

FIG. 9 illustrates how the sets of tillage elements and legs can readily be rotated or pivoted from the position shown in full lines in FIG. 9 to the position shown in broken lines depending upon whether right- or left-hand ploughing is required, depending upon which way along the field the plough is progressing.

Swinging the discs on a common mounting between the different positions as shown in FIG. 9, the tillage elements 20 can be individually pivotable as shown in FIG. 8. FIG. 8 illustrates in full lines the tillage element 20 mounted for rotation about an axle, one end of which is supported by a vertical pivot 30 which is carried by the frame or beam by a vertical leg 74. A cultivating leg 14 is provided adjacent the front edge of the tillage element 20 and carries a cutting edge 18. A landslide 16 is provided trailing behind the leg 74. In the full line position as shown in FIG. 8, the tillage element will shift soil from left to right in making a furrow. In the alternative position, with the tilling element 20 pivoted to the broken line position as shown in FIG. 8, the soil will be moved from right to left during forward progression of the plough. The frame or chassis 10 is adapted to be towed behind a tractor or the like by the links 12. A crumbler roller 50 or other soil engaging or working component may be connected to follow the array of tillage elements by being connected behind the frame 10, as shown in FIG. 9.

Operation of the plough will be described with reference to FIG. 7 in which the plough legs 14 have cutting edges 18 attached to the front thereof with the tillage element 20 being held in a vertical attitude with respect to the frame. The tillage element 20 engages the ground at the point of furrow 24, as cut by the cutting edge 18, the tillage element being land driven as the frame is pulled forward. The landslide 16 is provided behind each tillage element mounted by a leg to the frame to engage at least one side of an open furrow 26.

As the plough is pulled behind a tractor or the like, the cutting edge 18 engages the ground and cuts a rectangular shaped furrow, at the same time shattering the soil and penetrating to a constant depth, which may be greater or less than that of conventional ploughing systems. The vertically held plough tillage element 20 rotates behind the cutting edge 18. This rotation causes the furrow 24 to roll over, exposing new soil 28, and at the same time burying any straw or stubble. The dished peripheral portion to the rear of the tillage element then throws clean soil from the bottom of the furrow on top of the straw containing portion. The soil moves with a progressive rolling action and is deposited to give a well defined furrow even when ploughing soil at speed. This action does not create a plough pan as do conventional mouldboard ploughs. With the arrangement as shown in FIG. 7, the landslide 16 engages that side of the furrow 26 such that it can insert a pressure on the side of the furrow to counteract the reaction of the soil on the tilling element to permit the plough to run in a straight line.

Where the tillage elements are mounted in a simple frame, this permits the plough or other cultivating apparatus comprising the tillage element to be fully or semi-mounted behind a tractor.

FIG. 10 illustrates the manner in which access can be given to the supporting axle for the tillage element through the centre thereof. As illustrated in FIG. 10, a tillage element 20 is detachably mounted upon a hub or base 40. The hub 40 is mounted by means of a bearing 41 for rotation about a non-rotatable axle 44. The axle 44 projects through the centre of the tillage element 20 and has fixedly secured thereto a scraper element 42 by means of fastening means 43. The provision of such a scraper element is particularly suitable when tilling heavy ground for preventing the accumulation of sticky clay on the tillage element. The position of the scraper element can be adjusted to take into account movement of the tillage element between right-hand and left-hand ploughing. In another arrangement, an auxiliary scraper assembly can be provided which comprises a scraper to cooperate with the tillage element and having an edge shaped to fit the tillage element. Different scraper assemblies can be positioned for use during right-hand and left-hand ploughing.

FIG. 11 shows an arrangement in which a skimmer 52 is mounted to the axle 44. The skimmer is a disc also freely rotatable upon being dragged across the soil. It is of smaller diameter than the main tillage element 20 and is inclined at a greater angle to the direction of movement of the cultivator than the tillage element 20. It serves to turn over the top surface of the ground with deeper soil being picked up and inverted thereover by the action of the principal tillage element 20. Rotation of the skimmer disc is assisted mechanically by contact with soil which has already started to move under the action of the main tillage element 20.

FIG. 12 illustrates how the landslide 16 can extend rearwardly from the bottom of the leg 14 below the forward edge of the tillage element 20.

I claim:

1. Tilling apparatus comprising:

a frame;

a plurality of tillage elements mounted on the frame as to be movable each about a pivot axis between a first tilling position and a second tilling position in which the tillage element is reversed with respect to a direction of forward movement of the frame during tilling, said tillage elements being spaced apart diagonally across the frame with respect to said direction of forward movement, each tillage element having an axis of rotation about which it is rotatable to bring a portion of a forward edge of the tillage element into contact with the ground and the axes of rotation of the tillage elements being at least substantially parallel one with another, and each tillage element comprising a disc having a substantially planar central portion and an inclined flange portion extending from a periphery of said central portion, an abrupt transition being provided from the central portion to the flange portion;

a plurality of fixed soil penetrating elements each having a cutting edge for engaging the ground during tilling to cut a furrow and each being mounted in front of an associated one of said tillage elements; and a plurality of landslides each extending rearwardly from a said fixed soil penetrating element to pass, in use, below a said ground contacting forward edge portion of an associated one of said tillage elements in both the first and second tilling positions of that tillage element;

wherein the ground contacting forward edge portion of each said tillage element is substantially aligned with the pivot axis of that tillage element and also with its associated fixed soil penetrating element in both the first and second tilling positions of that tillage element.

2. Tilling apparatus as claimed in claim 1, wherein the forward edge of each said tillage element, in both the first position and the second position of that tillage element, engages the ground substantially at a point of the furrow as cut by the cutting edge of its associated soil penetrating element to cause the furrow to roll over.

3. Tilling apparatus according to claim 1, wherein the flange portion of each tillage element is substantially frustoconical.

4. Tilling apparatus according to claim 1, wherein the flange portion of each tillage element is inclined by an angle of up to 60° from the plane of the central portion.

5. Tilling apparatus according to claim 1, wherein the flange portion of each tillage element is inclined by an angle of from 30° to 55° from the plane of the central portion.

6. Tilling apparatus according to claim 1, wherein the flange portion of each tillage element is inclined by an angle of from 40° to 50° from the plane of the central portion.

7. Tilling apparatus according to claim 1, wherein the central portion of each tillage element extends for at least 60% of the overall diameter of the disc.

8. Tilling apparatus according to claim 1, wherein the central portion of each tillage element extends for at least 80% of the overall diameter of the disc.

9. Apparatus according to claim 1, wherein in both of said first and second positions the tillage elements are mounted with the planes of their central portions extending at an angle in the range of 30° to 70° to said direction of forward movement of the frame.

10. Apparatus according to claim 1, wherein in both of said first and second positions the tillage elements are mounted with the planes of their central portions extending at an angle in the range of from 40° to 60° to said direction of forward movement of the frame.

11. Apparatus according to claim 1, wherein the soil penetrating element depends from the frame and has a portion extending deeper than the level of the bottom of its associated tillage element.

12. Apparatus according to claim 1, wherein a landslide is provided behind each tillage element.

13. Apparatus according to claim 1, wherein the tillage elements are spaced diagonally across the frame.

14. Apparatus according to claim 13, including at least one ground support wheel rotatable about an axis which, when viewed in plan, is either transverse to, or inclined to, the direction of forward movement of the frame.

15. Apparatus according to claim 14, in which an array of said tillage elements is followed by a crumbler roller or other soil engaging components.

16. Apparatus according to claim 1, wherein an auxiliary scraper assembly is provided which comprises a scraper having an edge shaped to fit one of said tillage elements with which it is associated.

17. Apparatus according to claim 1, wherein the center of each disc is apertured to give access to a supporting axle for the disc, a scraper or skimmer being mounted to the axle through said aperture for cooperation with the tillage element.

* * * * *

UNITED STATES PATENT AND TRADEMARK OFFICE
CERTIFICATE OF CORRECTION

PATENT NO.   : 5,417,238
DATED        : May 23, 1995
INVENTOR(S)  : Peter D. T. Topham It is certified that error appears in the above-indentified patent and that said Letters Patent is hereby corrected as shown below:

Item [56]
On the Title Page under U.S. Patent Documents, reference 469,046, "Martin" should be --Marth--.

Col. 2,
On the Title Page under Attorney, Agent, or Firm, "Harness, Dickey & Pierce" should be --Harness, Dickey & Pierce, P.L.C.--.

Abstract, line 10, "a-plurality" should be --a plurality--.

Column 3, line 64, after "produce" insert --a--.

Column 4, line 11, "FIG." should be --FIGS.--.

Column 4, line 40, "FIG." should be --FIGS.--.

Column 4, line 40, "illustrates" should be --illustrate--.

Column 4, line 59, "FIG. 2 and 2a" should be --FIGS. 3 and 3a--.

Signed and Sealed this

Twelfth Day of September, 1995

Attest:

BRUCE LEHMAN

Attesting Officer        Commissioner of Patents and Trademarks